INVENTOR.
WALTER H. DAVIS, JR.
BY
ATTORNEY

United States Patent Office 3,334,533
Patented Aug. 8, 1967

3,334,533
STAPLE FIBER CUTTING MECHANISM
Walter H. Davis, Jr., Decatur, Ala., assignor to Monsanto Company, St. Louis, Mo., a corporation of Delaware
Filed Feb. 19, 1965, Ser. No. 434,056
9 Claims. (Cl. 83—100)

ABSTRACT OF THE DISCLOSURE

A double-acting, reciprocating staple fiber cutter which, by virtue of providing a pair of cutting edges spaced a distance less than a supply slot, is enabled to receive a constant speed supply when the dwell period of the cutter element coincides with the periods of register of the cutter block with the supply slot.

---

This invention relates generally to cutting devices and, more particularly, to an improved apparatus for use in cutting staple fiber from continuous filamentary tows, such as artificial and synthetic filaments, which cut staple exhibits a high degree of uniformity in length.

Conventional rotary staple cutters such as disclosed in U.S. Patent No. 1,723,998 to Beria take the form of a rotatably mounted, hollow disc having means disposed internally thereof defining an L-shaped passage communicating between a point located centrally of one face of the disc and an outlet point located on the periphery of the disc. Disposed immediately adjacent the peripheral face of the disc. There is provided a fixed cutter blade. By such arrangement, a continuous filamentary tow may be fed into the central opening of the passageway while the disc is caused to rotate at a high rate of speed, whereupon the tow is urged by centrifugal action through the passageaway to exit at the peripheral opening, whereat the tow is periodically severed by the stationary cutting blade. By varying either the diameter or speed of the rotor, or by varying the rate of feed of the tow through the central opening, or by any combination thereof, the average length of staple in each cut or pass of the cutter blade may readily be varied.

In using this type of cutter, a certain amount of twist is always imparted to filament bundle by virtue of the rotation of the filamentary elements of the bundle about the bundle axis, which twisting is caused by the rotation of the radially extending length of tow (taken with reference to the disc) about the axis of the tow being fed centrally into the rotating disc. The degree of twist so imparted depends upon the frictional characteristics of the particular filamentary bundle with reference to the interior surface of the right-angled passageway, the length of the passageway, the rate of feed of the bundle to the disc, and the speed of rotation of the disc. In that this twisting occurs about the axis of the filament bundle, the length of the outlying, spiralled filaments are of greater length than the more centralized filaments of the bundle, such comparative lengths of course being taken over a given unitary length of the bundle. Since this twist exists in the filament bundle at the moment of cutting, there results a non-uniformity in the length of the staple fibers which comprise each cut.

This variation in staple length is, in some applications, desirable, but there remain many other applications, such as in flocking materials, wherein even minor variations in staple length are not to be desired. In many flocking operations where the staple fiber extends perpendicularly to the surface of the substrate in which it is embedded, it is desired that the free ends of the fiber terminate in a substantially common plane, a result impossible to obtain when one is working with variable length staple fiber though the length variation may be over a relatively small range certain flocked articles can be adversely affected. A further aspect of the degree of staple length uniformity lies in the observation that, the greater the identity in length between individual staple fibers, the greater the uniformity of spun yarn produced therefrom.

With the above shortcomings in mind, it therefore becomes one object of the present invention to provide an improved combination feeding and cutting apparatus capable of cutting staple fiber from continuous filamentary tow into lengths possessing a high degree of staple length uniformity.

A further object of this invention in such an apparatus featuring a reciprocating cutting mechanism capable of effecting two complete, uniform cuts per cycle.

Still another object is such an apparatus wherein the feeding mechanism is in the form of a pair of synchronously driven endless belts arranged to supply in a positive and precise fashion a continuous length of filamentary tow in ribbon-form at a pre-selected rate to the cutting mechanism.

Another object is the provision of a cutting mechanism characterized by a double knife-edged cutting element mounted to reciprocate across a double knife-edged supply aperture to thereby effect two cuts per complete cycle of reciprocation of the cutting element, the cutting element being driven by a crankarm mechanism in such fashion that the dwell periods imparted to the cutting element coincide with the periods of register of supply passages formed in the cutting element with a supply slot to thereby facilitate changing of the cutting mechanism.

In accordance with this invention, the foregoing and other objects are attained by providing an apparatus for use in cutting staple fiber from continuous filaments tows, which fiber exhibits high degree of uniformity in staple length, as distinguished from the long-recognized variation in staple length characteristic of Beria-type rotary staple cutters. Such a cutting apparatus takes the form of a cutting block provided with a double knife-edged cutting element mounted to be reciprocated transversely of a double knife-edged supply slot to effect two complete cuttings of uniform length staple per cycle of reciprocation of the cutter block. Operation of such a cutting mechanism has been found particularly enhanced when used in combination with a feeding mechanism characterized by a pair of synchronously driven, endless belts mounted in face-to-face relationship so as to supply a continuous filamentary tow in the form of a ribbon-like configuration through the supply slot of the cutting mechanism. The ribbon-like configuration imparted to the tow bundle prior to its introduction into the cutter mechanism has, by virtue of the particular engagement effected by the cutter upon the tow, been found to optimize the degree of uniformity in staple length that may be realized in the use of the instant cutting apparatus. This is to say that, though the cutting mechanism per se has independent utility, it is, at the same time, to be recognized that its performance may be optimized when used in combination with the particular feeding mechanism where a staple length of high uniformity is desired.

Two features which particularly enhance the ability of my cutting mechanism to process tow supplied at high rates of speed lie in the provision of a crankarm mechanism for driving the cutter block through its path of reciprocation, plus the provision of a double knife-edged cutter element in which the vertical distance between the two cutting edges is less than the vertical dimension of the supply slot. By virtue of the crankarm drive feature, the cutter block, in its travel through one complete cycle of reciprocation, will experience two dwell periods. By arranging these dwell periods to coincide in time with the periods of register of the passages formed in the cutter block, the period of time in which a length of tow may fed through the supply slot, for a given speed of operation, is maximized. This optimization of the period during which tow may be supplied to the cutter prior to its severance is further enhanced by the second mentioned feature, i.e. the vertical dimension between the cutting edges relative to the vertical dimension of the supply slot. In providing that the cutting edges be separated a distance less than the depth of the cutting slot, there is insured at least a partial register between the supply slot and one of the passages formed in the cutting block at all times.

For a better understanding of the details of my invention, reference shall now be had to the accompanying drawings which are to be taken as illustrative, but not limitative, of one possible embodiment thereof and in which.

Figure 1:
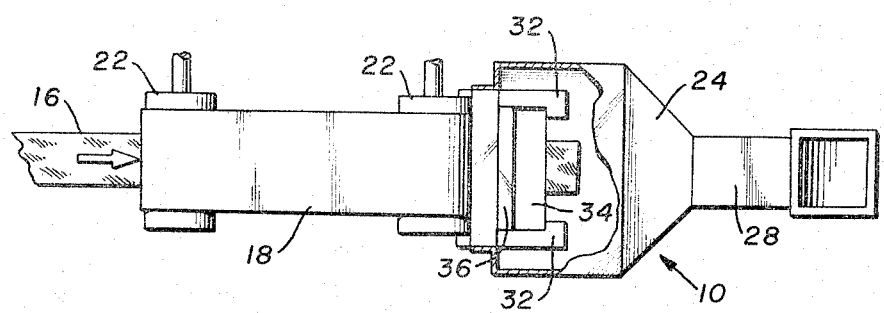
FIG. 1 is a top plan view of the apparatus showing the combination feeding and cutting mechanisms, with portions cut away for greater clarity.
Figure 2:
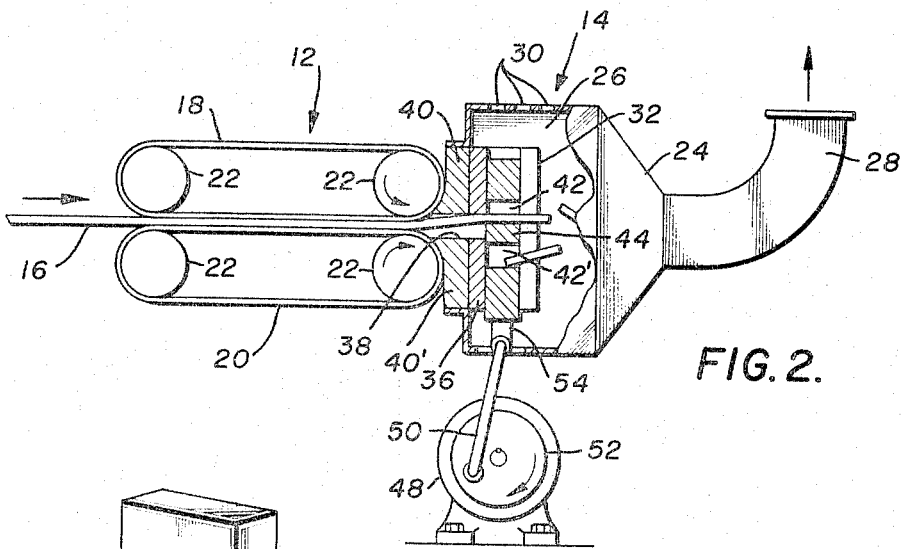
FIG. 2 is a side view of the apparatus shown in FIG. 1 also with portions cut away for clarity.

Turning first to the showings of FIGS. 1 and 2, there is shown a cutting apparatus, generally indicated by arrowed reference numeral 10, which is seen to comprise a feeding mechanism 12 and a cutting mechanism 14 arranged to receive a ribbon-shaped tow 16 supplied at a continuous, pre-selected and variable rate. The feeding mechanism is seen to comprise a pair of endless belts in the form of upper belt 18 and lower belt 20. These belts are mounted in a contiguous, face-to-face relationship and are driven by a suitable variable speed power source, not shown, such as an electric motor, the speed of the belts being synchronized to have a common peripheral speed. As a matter of convenience, each of the belts may be supported by a pair of rollers, one or more of which may be driven by a common or separate driving mechanism. As symbolized in the drawings, this endless belt feeding mechanism serves to supply the tow in a substantially ribbon-like configuration which, as later related, has been found to complement the operation of the cutting mechanism when one is attempting to obtain the highest degree of uniformity in staple length. The length of cut or speed of cutting is easily accommodated by such a feeding mechanism simply by varying the belt speed to establish the desired rate of supply.

Turning, now, to the details of the cutting mechanism 14, such mechanism is seen to be enclosed within a substantially funnel-shaped housing 24 to thereby define a staple fiber collection chamber 26 about the downstream end of the cutting mechanism. Housing 14 terminates in an exhaust conduit 28 connected to a source of vacuum, not shown, to thereby effect a rapid and controlled removal of the staple fiber from the area of the cutting mechanism. Suitable section slots 30 may be provided in the housing to aid vacuum removal of the staple.

The cutter mechanism is provided with a rigid guide block or track 32 in the form of a pair of spaced, vertically extending rails along which the cutter block 34 is constrained to move in a vertical direction, as viewed in FIG. 2 of the drawings. A stationary, vertically extending cutter plate 36, which may be formed integrally of guide block 32, has formed centrally thereof a horizontally extending supply slot 38 which is aligned to receive and position the continuous filamentary tow supplied from the feeding mechanism 12. In order to minimize the possibility of the tow becoming jammed or entangled in the belt assembly, it may be found desirable to provide a pair of doctor elements 40, 40' which serve to clear any entangled tow from the belt and to guide the tow from the exit nip of the feeding mechanism into the supply slot of the cutter plate. The cutter block, shown in perspective in FIG. 3, is arranged to be reciprocated vertically along the right-hand surface of cutter plate 36 (as viewed in FIG. 2) to sever any tow protruding from the supply slot.

Figure 3:
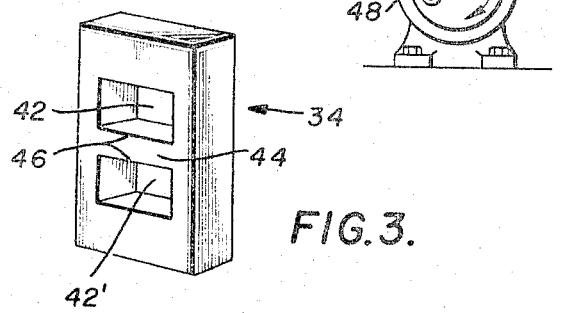
FIG. 3 is a perspective view of the cutter block shown in FIGS. 1 and 2.

As seen in FIG. 3, the cutter block is provided with a pair of spaced passages 42, 42' which are designed to alternately register with the supply slot 38 upon reciprocation of the cutter block through its designed path of travel. As previously mentioned, the vertical distance, as viewed in FIG. 2, between the two knife-edged portions of cutter element 44 is less than the vertical dimension of the supply slot 38, to thereby insure that one or the other of the passages 42, 42' is always in at least a partial register with slot 38 throughout the travel of the cutter block 34. By this feature, the length of tow, for a given speed of operation of the cutter mechanism, which may be fed through the slot prior to severance by the cutter element 44 is significantly increased. Also, this feature serves to minimize any tendency towards jamming the tow being fed through the slot at a high rate of speed against the cutter element, with the result that the instant cutting mechanism can be operated at extremely high rates of supply without jamming and without deleteriously effecting the uniformity in length of the resulting staple.

An additional important feature of my cutting mechanism, which also enhances the processing speeds at which it may be operated, lies in the provision of a crankarm drive mechanism for the cutter block 34, as depicted in FIG. 2. As there shown, such a drive mechanism, which, divorced of its particular inter-relationship with the cutter block, is conventional, may take the form of a variable speed electric motor 48 which drives connecting rod 50 through a fly-wheel crank element 52. The connecting rod 50 is hinged to the crank element 50 at a point off-center from its axis of rotation and is hingeably connected to the cutter block 34 by way of fitting 54. By this arrangement, it will be apparent, as is characteristic of all rotary-to-reciprocal mechanisms, that the cutter block 34 will, during the course of its travel through one complete cycle of reciprocation, experience a dwell period both at the bottom and top of its stroke of travel. This characteristic of crank-driven mechanisms has here been most beneficially employed to maximize the period of substantial register of the passages 42, 42' with the supply slot 38. This is accomplished by locating the passages 42, 42' in the cutter block 34 such that the period during which there is substantial registration between one of the passages and the supply slot coincides with the dwell period imparted to the cutter block by the crank-drive.

It may now be appreciated that there has been herewith disclosed a novel and beneficial staple fiber cutting apparatus designed to accomplish a staple cutting operation in such a fashion as to produce a highly uniform staple length, which apparatus features an endless belt feeding mechanism and a high-speed cutting mechanism inter-related with a crankarm drive mechanism in such fashion as to optimize the cutting action. By employing a pair of endless belts as the feeding mechanism, one is enabled to present a most efficient, ribbon-shaped filamentary bundle to the cutting mechanism. In providing a crankarm-driven, double-edged, reciprocating cutting element, one is enabled to effect two complete cuts per cycle at rates of supply heretofore impracticable without the jamming problems and deleterious effects upon the uniformity of length of the staple normally attending high-speed operations. This has been accomplished by two complementary features, namely, the relative vertical dimensions of the supply slot vis-a-vis the cutter element and by causing the dwell periods of the cutter block to coincide with the periods of substantial register of the passages formed therein with the supply slot.

Obviously, numerous modifications and variations of the present invention are possible in the light of the above teachings. It is, therefore, to be understood that, within the scope of the appended claims, the invention may be practiced otherwise than as specifically described herein.

What is claimed is:

1. An improved apparatus for use in cutting staple fiber of highly uniform length comprising, in combination, a tow cutting mechanism and a continuous tow feeding mechanism arranged to supply said cutting mechanism, said cutting mechanism comprising a vertically extending, fix-mounted cutter plate, a horizontally extending, double knife-edged supply slot formed in said plate and aligned to receive tow supplied from said feeding mechanism a double knife-edged cutter block mounted to vertically reciprocate immediately adjacent said cutter plate and transversely of said knife-edge slot to thereby sever successive segments of tow passed through said slot into uniform length staple, said double knife-edged cutter block being further characterized by a pair of spaced passages extending through said block transversely of its plane of travel, a double knife-edged cutter element interposed between said passages, the knife-edged portions of said cutter element extending horizontally parallel and immediately adjacent said cutter plate, the knife-edged portions of said cutter element being spaced vertically from each other a distance less than the vertical dimension of said slot, whereby, upon passing said cutter block through one complete cycle of reciprocation, two successive segments of uniform length staple may be cut.

2. The apparatus as recited in claim 1 wherein said continuous tow feeding mechanism comprises a pair of synchronously driven endless belts mounted in face-to-face relationship and aligned to precisely drive a continuous multi-filament tow at a predetermined rate through said supply slot.

3. An improved apparatus for use in cutting staple fiber of highly uniform length comprising, in combination, a tow cutting mechanism and a continuous tow feeding mechanism arranged to supply said cutting mechanism, said cutting mechanism comprising a vertically extending, fix-mounted cutter plate, a horizontally extending, double knife-edged supply slot formed in said plate and aligned to receive tow supplied from said feeding mechanism, a double knife-edged cutter block mounted to vertically reciprocate immediately adjacent said cutter plate and transversely of said knife-edged slot to thereby sever successive segments of tow passed through said slot into uniform length staple, said cutter block being characterized by an integrally formed cutter element disposed substantially centrally of said cutter block and flanked by a pair of passages extending through said block transversely of its plane of travel, a pair of vertically spaced, horizontally extending knife-edged portions formed on said cutter element immediately adjacent said passages to extend substantially transversely of the plane of travel of said cutter block, said knife-edged portions being spaced from one another a distance less than the vertical dimension of said slot, whereby, upon reciprocation of said cutter block through a complete cycle, each of said pair of passages is caused to register alternately with said slot to allow the passage of a predetermined length of tow therethrough and each of said pair of spaced knife-edged portions is caused to pass across said slot to thereby sever two successive segments of tow into uniform length staple.

4. The apparatus as recited in claim 3 wherein said cutter mechanism is enclosed within a slotted housing to thereby define a staple collection chamber, said chamber communicating with a source of vacuum, variable speed crankarm drive means connected to drive said cutter block at preselected frequencies of traverse, the dwell periods of said crankarm drive means coinciding with the periods of register of said passages with said supply slot.

5. The apparatus as recited in claim 3 wherein said continuous tow feeding mechanism comprises a pair of synchronously driven endless belts mounted in face-to-face relationship and aligned to precisely drive a continuous multi-filament tow at a predetermined rate through said supply slot.

6. The apparatus as recited in claim 5 wherein said cutter mechanism is enclosed within a slotted housing to thereby define a staple collection chamber, said chamber communicating with a source of vacuum, variable speed crankarm drive means connected to drive said cutter block at pre-selected frequences of traverse, each of the two dwell periods imparted to said cutter block by said crankarm drive means coinciding with the period of register of one of said passages with said supply slot.

7. An improved staple fiber cutting mechanism operative to cut staple of highly uniform length comprising a fixedly mounted, vertically extending cutter plate, a horizontally extending, double knife-edged supply slot formed in said plate, a double knife-edged cutter block mounted to reciprocate vertically immediately adjacent said cutter plate and transversely of said knife-edged slot to thereby sever successive segments of tow passed through said slot into uniform length staple, said double knife-edged cutter blocks being characterized by a pair of spaced passages extending through said block transversely of its plane of travel, a double knife-edged cutter element interposed between said passages, the knife-edged portions of said cutter element extending horizontally parallel to said cutter plate, the knife-edged portions of said cutter element being spaced vertically from one another a distance less than the vertical dimension of said slot, whereby, upon passing said cutter block through one complete cycle of reciprocation, two successive segments of uniform length staple may be cut.

8. An improved staple fiber cutting mechanism operative to cut staple of highly uniform length comprising a fixedly mounted, vertically extending cutter plate, a horizontally extending, double knife-edged supply slot formed in said plate, a double knife-edged cutter block mounted to reciprocate vertically immediately adjacent said cutter plate and transversely of said knife-edged slot to thereby sever successive segments of tow passed through said slot into uniform length staple, said cutter block being characterized by an integrally formed element disposed substantially centrally of said block and flanked by a pair of passages extending through said block transversely of its plane of travel, a pair of vertically spaced, horizontally extending knife-edged portions formed on said cutter element immediately adjacent said passages to extend substantially transversely of the plane of travel of said cutter block, said knife-edged portions being spaced from each other a distance less than the vertical dimension of said slot, whereby, upon reciprocation of said cutter block through a complete cycle, each of said pair of passages is caused to register alternately with said slot to allow the passage of a predetermined length of tow there-through and each of said pair of spaced knife-edged portions is caused to pass across said slot to thereby sever two successive segments of said tow into uniform length staple.

9. The cutting mechanism as defined in claim 8 and further comprising a crankarm means connected to drive said cutter block at selected frequencies of reciprocation during each cycle of which the cutter block experiences two dwell periods, the crankarm connection to the cutter block being such that each dwell period coincides with the period of register of one of said passages with said supply slot.

References Cited

UNITED STATES PATENTS

| | | | |
|---|---|---|---|
| 1,792,522 | 2/1931 | Yates | 83—198 |
| 2,014,947 | 8/1935 | McCulloch et al. | 83—918 X |
| 2,258,348 | 10/1941 | Biggert | 83—578 X |
| 2,489,921 | 11/1949 | Moore | 83—578 X |
| 2,757,733 | 8/1956 | Cunningham | 83—578 |
| 2,821,253 | 1/1958 | Heffelfinger et al. | 83—355 |
| 3,228,274 | 1/1966 | Cagen | 83—355 X |

WILLIAM W. DYER, JR., *Primary Examiner.*

JAMES M. MEISTER, *Examiner.*